T. FAIRBANKS.
Weighing-Scale.
No. 202,800. Patented April 23, 1878.
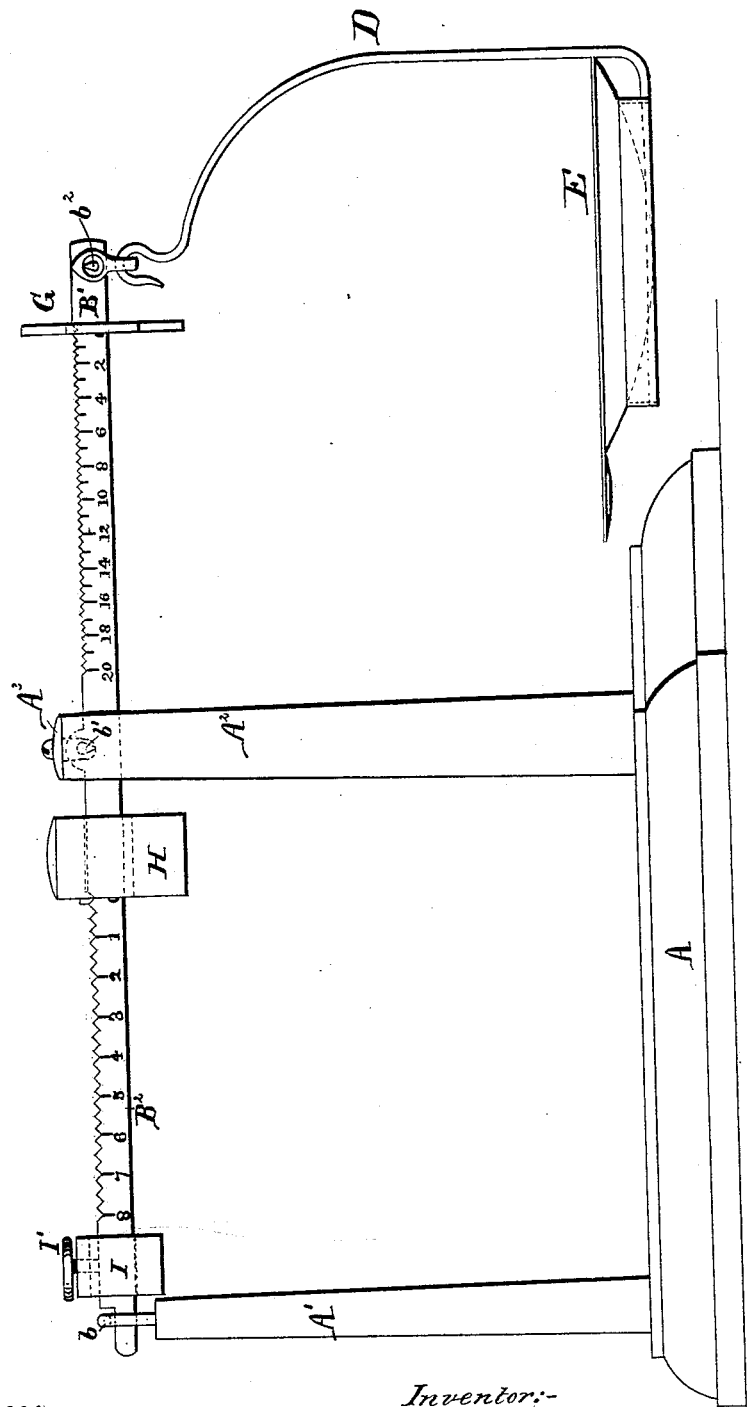

UNITED STATES PATENT OFFICE.

THADDEUS FAIRBANKS, OF ST. JOHNSBURY, VERMONT.

IMPROVEMENT IN WEIGHING-SCALES.

Specification forming part of Letters Patent No. 202,800, dated April 23, 1878; application filed February 19, 1878.

*To all whom it may concern:*

Be it known that I, THADDEUS FAIRBANKS, of St. Johnsbury, Caledonia county, in the State of Vermont, have invented certain new and useful Improvements relating to Weighing-Scales, of which the following is a specification:

The improved scale is particularly well adapted for druggists' dispensing-scales, where the poise is set first, and the quantity of material in the pan is increased or diminished to the required amount.

I propose to call the scale a druggist's dispensing-scale, but it may be used in small and accurate weighing of any material, and for any purpose.

I balance a beam on knife-edges near its center, graduate both arms, attach a pendent frame for the pan at one end, an adjustable balance-weight firmly secured by a pinching-screw at the other end, and use two poises, one on each arm, to determine the weight by shifting them to different notches or graduations thereon.

The arm to which the article to be weighed is suspended carries a small poise, by shifting which grains are determined. The other arm carries a large poise, by shifting which drams or other larger divisions are indicated.

The accompanying drawing forms a part of this specification, and represents what I consider the best means of carrying out the invention. It is a side elevation, showing the scale unloaded and balanced.

The stationary work or support is marked A $A^1$ $A^2$, $A^1$ being the main post, or pair of posts, which supports the free end of the beam. A loop of wire, $b$, cast in the top of $A^1$ stretches over and cages the beam with liberty for sufficient motion. $A^3$ is a binder, which is screwed down upon the top of the posts $A^2$, over the beam, and prevents its ever getting deranged from any jostling or disturbance.

$B^1$ $B^2$ is the beam turning on a central knife-edge, $b^1$. D is a pendent frame swinging from a loop hung on a knife-edge, $b^2$. This frame receives a pan, E, in which may be placed the article to be weighed. G is a thin and light poise embracing the arm $B^1$, capable of being shifted to any of the notches thereon. H is a larger poise embracing the arm $B^2$, and adapted to be shifted to any of the notches or positions thereon. I is a poise held firmly by a pinching-screw, I', and capable of being adjusted outward and inward a little. It exactly balances the system when the poises G and H are each on their zero-mark and the pan E is empty.

In the use of the device, the powder or other article to be weighed is placed in the pan E, and rested on the frame D. Then the poise H is moved outward to determine the next smaller weight in drams, and the poise G moved inward till the beam balances. The position of the poise H gives the drams, and that of the poise G the grains.

In weighing very light articles, only the poise G will be moved. I have graduated the arm $B^1$ for half-grains.

I have made the poise G with considerable length, and given a handle form to both ends. This facilitates the adjusting of this light member.

The frame A $A^1$ $A^2$ may be made of a single piece of cast-iron.

My poises are adapted to be readily shifted to determine weights, as above described. For ordinary dispensing, it will be understood that the poises are usually adjusted in the required notches before the powder or other article is introduced in the pan, and that the medicine is introduced until the beam tilts.

I have described the scale as arranged for Troy weight, as required for weighing by druggists and gold-dealers; but it may be graduated for avoirdupois or other weights, as required, for letter-scales, and other general purposes.

I claim as my invention—

The dispensing-scales herein described, consisting of the post or posts $A^1$ $A^2$, graduated beam $B^1$ $B^2$, suspended near its center, the part $B^1$ of the beam being graduated in a reverse direction, and of a less denomination than the part $B^2$, balancing-weight I, and poises G H, as herein specified.

In testimony whereof I have hereunto set my name in presence of two subscribing witnesses.

THADDEUS FAIRBANKS.

Witnesses:
E. D. BLODGETT,
D. DEAN PATTERSON.